United States Patent [19]

Chamberlain

[11] Patent Number: 4,474,013
[45] Date of Patent: Oct. 2, 1984

[54] OVERSPEED ANTICIPATION CIRCUIT FOR STEAM TURBINE SPEED CONTROL

[75] Inventor: Harvey H. Chamberlain, Marblehead, Mass.

[73] Assignee: General Electric Company, Lynn, Mass.

[21] Appl. No.: 554,550

[22] Filed: Nov. 23, 1983

[51] Int. Cl.³ .............................................. F01K 13/02
[52] U.S. Cl. ........................................ 60/660; 417/17; 417/30
[58] Field of Search ...................... 60/660; 417/17, 30, 417/36

[56] References Cited

U.S. PATENT DOCUMENTS 3,340,883 12/1967 Peternel ............................ 415/17 X
3,798,907 3/1974 Barrett et al. ........................ 60/660
3,859,006 1/1975 Randell ................................ 415/17

Primary Examiner—Allen M. Ostrager
Attorney, Agent, or Firm—James W. Mitchell

[57] ABSTRACT

An overspeed detection circuit for producing an overspeed trip signal for shutting off a supply of motive fluid to a prime mover upon the prime mover exceeding an overspeed trip limit includes a differentiating circuit effective to differentiate a speed signal to produce an acceleration signal related to the rate of change in the speed signal. The acceleration signal is summed with the speed signal to produce an effective speed signal which anticipates the crossing of an overspeed threshold when a fault permits a constant speed increase to occur but does not force the summed signal to cross the overspeed threshold when normal speed control is exercised.

6 Claims, 7 Drawing Figures

OVERSPEED ANTICIPATION CIRCUIT FOR STEAM TURBINE SPEED CONTROL

CROSS-REFERENCE TO RELATED APPLICATIONS

The present application is related to a prior United States Patent Application of common assignee, entitled TURBINE SPEED CONTROL, filed June 18, 1982, and assigned patent application Ser. No. 389,608. The disclosure of this related application is herein incorporated by reference.

BACKGROUND OF THE INVENTION

This invention relates, in general, to the speed control of prime movers and, in particular, to the speed control of prime movers during proportional speed, overspeed and emergency overspeed conditions.

Prime movers operate under the control of large in-line fluid control valves which regulate the flow of motive fluid into the prime mover. These fluid control valves may include a stop valve and a control valve positioned in series in a steam header upstream from the steam turbine. The control valve may be set to any intermediate position between full open and full closed, whereas the stop valve is usually full open or full closed. The earliest speed control devices for prime movers were strictly mechanical and were called fly-ball governors. As the size of prime movers increased, the fly-ball governor was enhanced by fluid operated relays and so mechanical hydraulic control entered the marketplace.

Mechanical hydraulic control is gradually being replaced by an electrohydraulic control which replaces fly-ball governors with a magnetic pick-up and toothwheel to provide speed feedback information to an electric control.

U.S. Pat. No. 3,242,346 to Skoubo shows the use of a silicon controlled rectifier to be used primarily as an overspeed control for a prime mover.

Although primary overspeed control is capable of sensing normal changes in speed sufficiently fast to maintain control of turbine speed, certain failure-related conditions are capable of producing speed changes which occur too rapidly for normal control, or even an overspeed trip device, to timely react. For example, if a main control valve is stuck open upon the occurrence of a substantial load shed, the turbine speed, instead of responding to the normal control signals tending to reduce the turbine speed, begins a rapid and substantially constant speed increase. If left unchecked, this speed increase can exceed the overspeed trip limit of about 110 percent in about 0.5 seconds for a full load rejection. By the time a conventional stop valve can be actuated in response to this condition, the turbine speed may increase well beyond the overspeed trip limit.

SUMMARY OF THE INVENTION

The present invention provides an anticipation circuit for sensing a speed condition in which the turbine speed is unresponsive to normal control signals and anticipates the turbine exceeding an overspeed trip limit. The anticipation circuit responds normally to speed conditions in which the turbine speed remains under control of normal control valve inputs.

According to an embodiment of the invention, there is provided an overspeed detection circuit for producing an overspeed signal for use in controlling a prime mover of a type including a stop valve effective for shutting off a supply of motive fluid to the prime mover upon receipt of the overspeed signal comprising means for generating a speed signal related to a speed of the prime mover, means for producing an acceleration signal related to a rate of change of the speed signal, means for summing the speed signal with the acceleration signal to produce a summed signal, means for differencing the summed signal at least with a reference signal to produce a difference signal and means for detecting a predetermined condition of the difference signal and for producing the overspeed signal in response thereto.

According to a feature of the invention, there is provided a method for detecting an overspeed condition and for producing an overspeed signal for use in controlling a prime mover of a type including a stop valve effective for shutting off a supply of motive fluid to the prime mover upon receipt of the overspeed signal comprising generating a speed signal related to a speed of the prime mover, producing an acceleration signal related to a rate of change of the speed signal, summing the speed signal with the acceleration signal to produce a summed signal, differencing the summed signal at least with a reference signal to produce a difference signal and detecting a predetermined condition of the difference signal and producing the overspeed signal in response thereto.

Briefly stated, the present invention provides an overspeed detection circuit for producing an overspeed trip signal for shutting off a supply of motive fluid to a prime mover upon the prime mover exceeding an overspeed trip limit. The overspeed detection circuit includes a differentiating circuit effective to differentiate a speed signal to produce an acceleration signal related to the rate of change in the speed signal. The acceleration signal is summed with the speed signal to produce an effective speed signal which anticipates the crossing of an overspeed threshold when a fault permits a constant speed increase to occur but does not force the summed signal to cross the overspeed threshold when normal speed control is exercised.

OBJECTS OF THE INVENTION

Accordingly, it is an object of the invention to provide an overspeed anticipation circuit for a steam turbine which overcomes the drawbacks of the prior art.

It is a further object of the invention to provide an overspeed anticipation circuit for a steam turbine which employs the sum of a turbine speed and a turbine acceleration to anticipate an overspeed condition.

The above, and other objects, features and advantages of the present invention will become apparent from the following description read in conjunction with the accompanying drawings, in which like reference numerals designate the same elements.

DETAILED DESCRIPTION OF THE INVENTION

Figure 1:
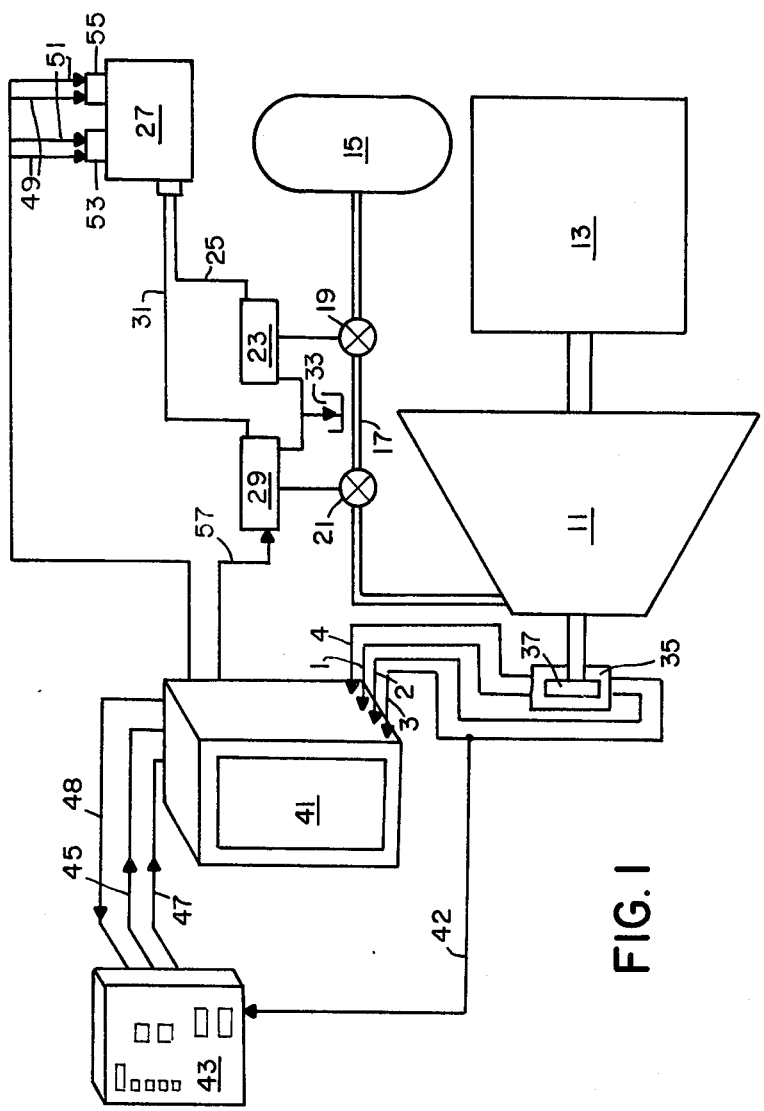
FIG. 1 is a block diagram of a prime mover speed control system in accordance with the present invention.

FIG. 1 shows a schematic arrangement of a control system for a prime mover omitting those elements not essential to the functioning of the control system. A prime mover or turbine 11 is connected to a load 13 which may be either electrical or mechanical. A steam generator 15 provides motive fluid to the steam turbine through a steam header pipe 17. Steam header pipe 17 also includes, in-line and in series, a stop valve 19 and a control valve 21 to regulate the flow of steam into turbine 11. Stop valve 19 is positioned by means of a hydraulic actuator 23 which is supplied with high pressure hydraulic fluid through pipe 25 from oil reservoir 27. Control valve 21 is positioned by means of a hydraulic actuator 29 which is supplied with high pressure hydraulic fluid through a pipe 31 from oil reservoir 27. Hydraulic actuators 23 and 29 are shown connected to a drain 33.

The speed sensing or speed feedback portion of the control system is partially contained in a turbine front standard 35 which encloses a toothed wheel 37 driven by turbine 11. A plurality of redundant speed pick-ups 1, 2, 3 and 4 provide three primary speed signals 1, 2 and 3; and, one emergency overspeed signal 4. The four speed signals are input into a control cabinet 41 which houses the electronics associated with the speed control system as shown in greater detail in FIG. 2. One of the speed feedback signals for example, 3, may be tapped to feed a line 42 to provide a driver signal for a display which is contained on operator panel 43. Operator panel 43 enables the turbine operator to input operational commands such as, speed set or load set, into control cabinet 41 on a line 45 and a line 47 respectively. A cable 48 provides a speed set or load set feedback to operator panel 43. The outputs of control cabinet 41 include first and second primary trip signals 49 and first and second emergency trip signals 51. Emergency trip devices (ETD's) 53 and 55 are each mounted on oil reservoir 27 and may be de-energized to trip in a manner described in the related application. A speed-load control signal (S/L) is communicated to control valve hydraulic actuator 29 on a line 57 to provide proportional control for turbine 11.

Figure 2:
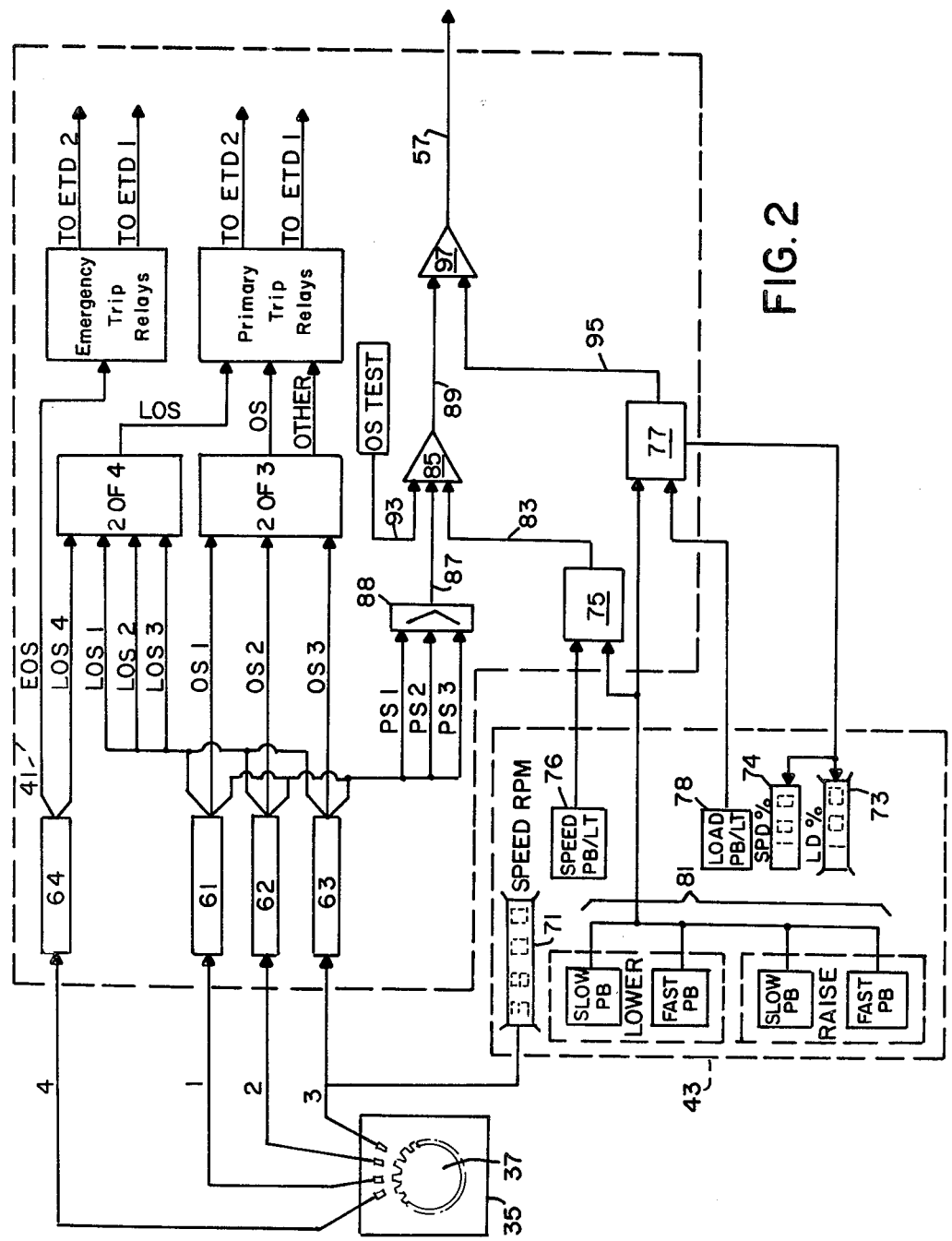
FIG. 2 is a signal flow diagram of a prime mover speed control system including the control cabinet, operators panel and input/output signals.

Referring to FIG. 2, the plurality of speed pick-ups, 1, 2, 3 and 4, are shown in proximity to toothed wheel 37. Each of speed signals 1, 2, 3, and 4 is a pulse train output having a frequency proportional to the speed of toothed wheel 37. Control cabinet 41 and operator's panel 43 are outlined by dashed boxes.

Speed signals 1, 2 and 3 are each applied to one of three identical speed translators 61, 62 and 63 respectively which provide three functional outputs comprising proportional speed PS, overspeed OS and loss of signal LOS. Speed translators 61, 62 and 63 each provide an output voltage proportional to speed on lines PS1, PS2 and PS3. Further, speed translators 61, 62 and 63 each provide an overspeed signal on lines OS1, OS2 and OS3. The overspeed signals may be generated by a comparison of actual speed with a overspeed trip (e.g., 110 percent of rated speed) to generate a voltage signal and corresponding contact closure if primary overspeed is reached. Finally, speed translators 61, 62 and 63 each provide a loss of signal output LOS1, LOS2 and LOS3, whenever the actual speed signal falls below a low threshold value and this also results in a contact closure.

Speed signal 4 is applied to an emergency overspeed channel including an emergency overspeed speed translator 64. The structure and function of the emergency overspeed channel is not considered to be an inventive part of the present application but is disclosed in detail in the above-referenced related patent application. Therefore, further disclosure of the emergency overspeed channel is omitted here.

Speed translators 61, 62 and 63 are identical. Thus, the following description of speed translator 61 will be understood to apply equally to all three of the speed translators.

Figure 3:
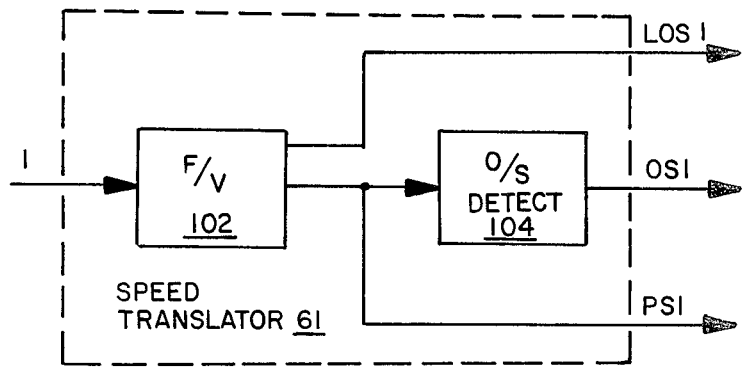
FIG. 3 is a simplified block diagram of a speed translator of FIG. 2.

Referring now to FIG. 3, speed translator 61 includes a conventional frequency-to-voltage converter 102 which is effective to convert the frequency of the incoming speed signal 1 into an analog proportional speed signal PS1 which is applied to an overspeed detection circuit 104 as well as to external circuits (see FIG. 2). Frequency-to-voltage converter 102 also contains a conventional loss-of-signal detection circuit (not shown) which produces loss of signal LOS1 when it fails to receive speed signal 1.

Figure 4:
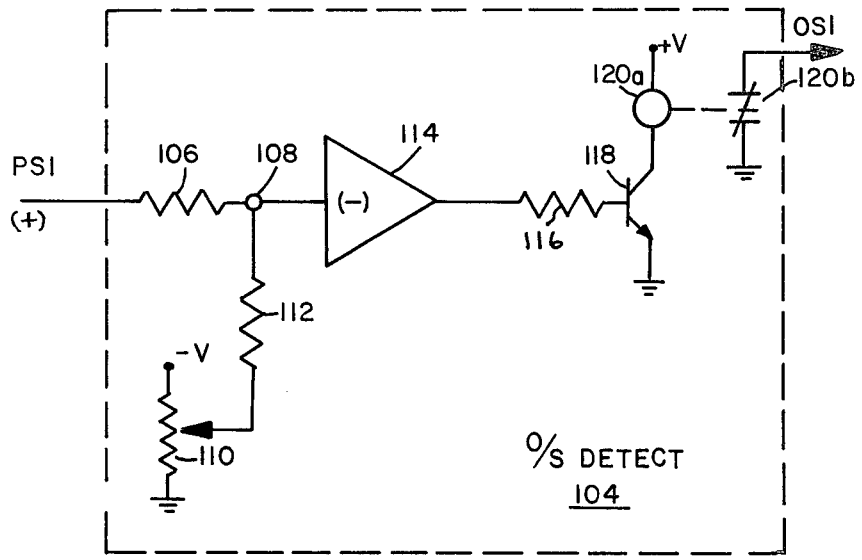
FIG. 4 is a schematic diagram of an overspeed detection circuit according to the prior art.

Referring now to FIG. 4, there is shown an embodiment of overspeed detection circuit 104 according to the prior art. Proportional speed signal PS1 is applied through an input resistor 106 to a summing point 108. A reference voltage generator which may be, for example, a variable resistor 110, applies a selectable negative reference voltage to a summing resistor 112. The other end of summing resistor 112 is connected to summing point 108. The voltage at summing point 108 is applied to a negative input of a threshold circuit 114. The output of threshold circuit 114 is applied through an output resistor 116 to the base of a transistor 118. A coil 120a of an overspeed relay 120 is connected in series with a positive voltage +V and the collector-emitter path of transistor 118 to ground. A normally-closed contact 120b of relay 120 between ground and the external circuit shown in FIG. 2 is opened when relay coil 120a is energized and is closed when relay coil 120a is deenergized. It would be clear to one skilled in the art, of course, that other types of signals may be provided to create overspeed signal OS1 besides a ground or nonground condition.

Assuming that the values of resistors 106 and 112 are equal, as long as proportional speed signal PS1 remains below the negative reference voltage, the voltage at summing point 108 remains negative and the output of threshold circuit 114 remains positive. This maintains transistor 118 in the saturated or conducting condition and thereby maintains relay coil 120a energized and overspeed signal OS1 in the ungrounded, or normal condition. When proportional speed signal PS1 exceeds the negative reference voltage, the voltage at summing point 108 becomes positive and the output of threshold circuit 114 changes from positive to zero, or negative. This cuts off transistor 118, deenergizes relay coil 120a and closes contact 120b, thus producing an overspeed indication OS1 for use in external circuits.

Figure 5:
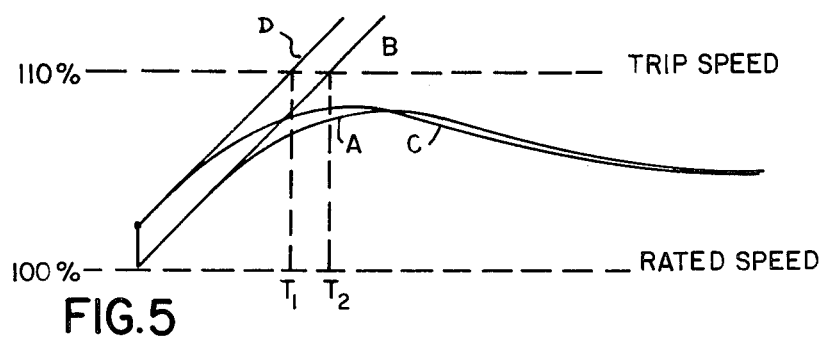
FIG. 5 is a set of curves to which reference will be made in describing the signal processing in the overspeed detection circuits of the prior art and of the present invention.

Referring now to FIG. 5, in a primary overspeed situation created, for example by a substantial load shed, the normal response of the speed control circuits closes control valve 21 (FIG. 2) rapidly enough that the speed follows a normal curve A in which a rapid initial increase is followed by a flattening of the speed curve and finally a reduction in speed before the turbine speed reaches a trip speed of, for example, 110 percent of rated speed. If control valve 21 fails to respond to the overspeed signal, then the turbine speed continues to increase linearly, as indicated by straight-line curve B, until it crosses the primary trip-speed threshold at a time T2. When the primary trip-speed threshold is crossed, stop valve 19 (FIG. 1) begins to close. From the time the load shed occurs until the primary trip-speed threshold is crossed, about 0.5 seconds elapses. By this time, with an uncontrolled speed increase, a final speed considerably above the trip speed will be attained before stop valve 19 is able to bring it under control. This speed increase after the valve closes is due primarily to entrained steam within the system.

Figure 6:
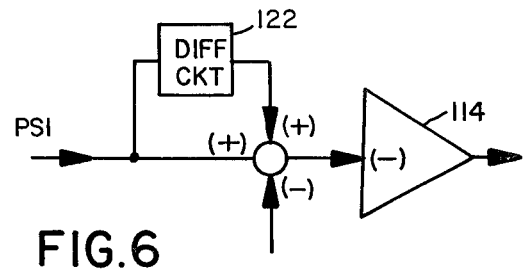
FIG. 6 is a simplified block diagram of a portion of an overspeed detection circuit according to an embodiment of the invention.

Referring momentarily to FIG. 6, there is shown a logic diagram of a portion of an overspeed detection circuit according to an embodiment of the invention. The present invention adds a differentiating circuit 122 which adds a signal proportional to the rate of change of proportional speed signal PS1 to the speed signal itself so that a resulting apparent speed signal fed to threshold circuit 114 anticipates the crossing of the trip speed threshold when a malfunction permits uncontrolled speed to develop but which does not cross the primary trip-speed threshold when normal control is exercised.

The effect of this improvement is shown in the apparent speed curves C and D of FIG. 5. When the load shed occurs, the component of acceleration added by differentiating circuit 122 to proportional speed signal PS1 immediately raises the level of the signal fed to summing point 108. When normal control is being exercised by control valve 21, the decreasing acceleration rapidly slows the increase in the apparent speed so that the normal apparent speed signal C remains well below the primary overspeed trip value. When a malfunction permits a constant speed increase to occur, the apparent speed follows curve D which crosses the primary trip-speed threshold at a time $T_1$ which is earlier than time $T_2$. Using the earlier trip time $T_1$ attained using the apparent speed signal provides a trip when the actual turbine speed is substantially lower than is attainable using the turbine proportional speed signal PS1 alone, and thus permits bringing the turbine speed under control after a maximum speed excursion which is substantially less than is possible with the apparatus of the prior art.

Figure 7:
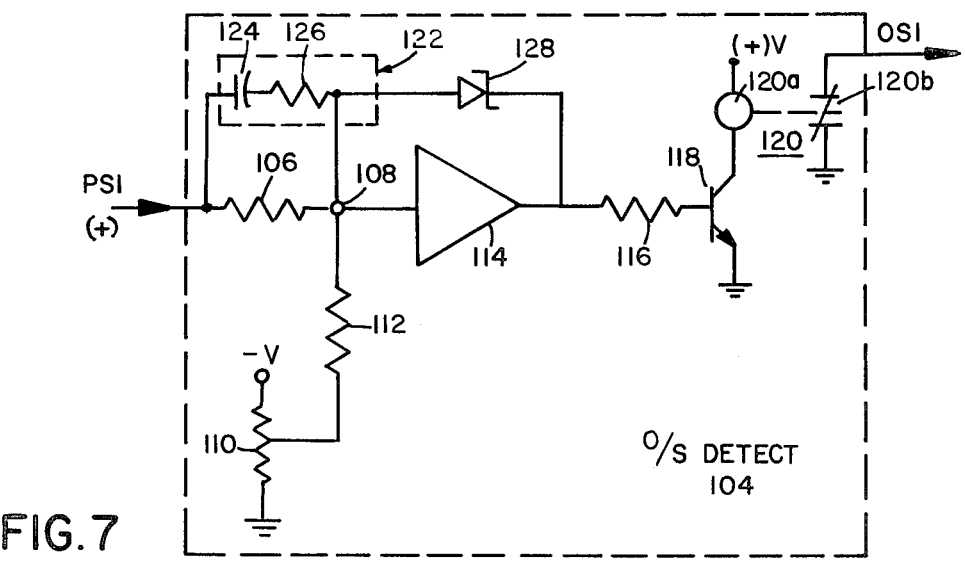
FIG. 7 is a complete schematic diagram of an overspeed detection circuit according to the invention.

Referring now to FIG. 7, differentiating circuit 122 includes a capacitor 124 in series with a resistor 126 between proportional speed signal PS1 and summing point 108. Thus, in theory, a signal proportional to turbine acceleration is added to the speed signal at summing point 108. In order for the circuit to work properly, a fixed reference must be provided for the output of differentiating circuit 122 so that threshold circuit 114 may respond to the sum of currents rather than to the sum of voltages fed to it. To accomplish this, a breakdown diode, or Zener diode 128 is connected as a feedback element with its cathode terminal connected to the output of threshold circuit 114 and its anode terminal connected to summing point 108. Zener diode 128 may have any convenient breakdown voltage suitable for saturating transistor 118. For example, Zener diode 128 may have a breakdown voltage of 10 volts. Thus, as long as proportional speed signal PS1 remains below reference voltage, the output of threshold circuit 114 remains at 10 volts and thus maintains transistor 118 in the saturated condition. During this time, the presence of Zener diode 128 as a feedback element maintains the voltage at summing point 108 equal to zero volts. This provides the required reference for differentiating circuit 122.

Upon the occurrence of a load shed, the currents fed on parallel paths through input resistor 106 and differentiating circuit 122 are summed with current fed through resistor 112 and current fed back through Zener diode 128 to maintain a zero voltage at summing point 108 until the sum of the currents fed forward through input resistor 106 and differentiating circuit 122 sum to slightly more than zero with the negative current fed through resistor 112. At that time, ignoring forward diode drops, the output of threshold circuit 114 falls to zero and thus cuts off transistor 118 to thereby produce overspeed signal OS1.

Referring again to FIG. 2, operator panel 43 includes a turbine speed indicator 71. An indicator 73 displays information regarding the percent of actual turbine load relative to its respective setpoint. Likewise, an indicator 74 shows similar information relating to speed setpoint. The speed or load setpoint may be entered into either a speed setpoint register 75 or a load setpoint register 77 in the control cabinet dependent upon selection of a permissive pushbutton 76 or 78 and operation of one of the slow/fast-raise/lower pushbuttons 81 as shown. The speed set signal on line 83 is input into a comparator 85 for comparison with a proportional speed feedback signal on a line 87 to produce a speed error signal on a line 89. The proportional speed feedback signal is chosen from signals PS1, PS2 or PS3 in a high value gate 88. An overspeed test signal (OS TEST) for the proportional speed circuit; i.e., the control valve, may also be applied to comparator 85 on a line 93. This signal is used as a test signal for the proportional speed channel. The speed error signal on line 89 is compared with a load set signal on a line 95 in a comparator 97 to output a valve position signal or speed/load control signal heretofore identified by the numeral 57 in FIG. 1.

The operation of the control system is as follows: Under normal operating conditions, control of the prime mover is under the influence of control valve 21 and proportional speed control through hydraulic actuator 29. The proportional speed channel is protected by its own overspeed circuit and the loss of signal channel which requires 2 out of 4 signals to trip. If a primary overspeed condition develops; i.e., 110 percent of rated speed, the primary overspeed channel will trip turbine 11 if a 2 out of 3 signal configuration results. However, in accordance with the present invention, if an overspeed trip condition is anticipated by differentiating circuit 122 (FIG. 6), the primary overspeed trip will occur at an earlier time $T_1$ because of the apparent speed signal which has been added. Likewise, loss of signal protection is still in force. If an emergency overspeed condition develops; i.e., 112 percent of rated speed, the emergency overspeed protection circuit will trip turbine 11. The primary energize to trip relays allows the trip signal path to operate in a de-energized mode until needed while the emergency trip relays are configured in a back-up fail-safe mode. Moreover, the emergency overspeed channel includes a passive speed translator and redundant trip relays to obviate trips due to trip relay failure.

While there has been shown what is considered to be a preferred embodiment of the invention, it is recognized that other modifications may be made therein, and it is intended to cover all such modifications as fall within the true spirit and scope of the invention.

What is claimed is:

1. An overspeed detection circuit for producing an overspeed signal for use in controlling a prime mover of a type including a stop valve effective for shutting off a supply of motive fluid to said prime mover upon receipt of said overspeed signal comprising:

means for generating a speed signal related to a speed of said prime mover;

means for producing an acceleration signal related to a rate of change of said speed signal;

means for summing said speed signal with said acceleration signal to produce a summed signal;

means for differencing said summed signal at least with a reference signal to produce a difference signal; and means for detecting a predetermined condition of said difference signal and for producing said overspeed signal in response thereto.

2. An overspeed detection circuit according to claim 1 wherein said means for detecting a predetermined condition includes said summed signal exceeding said reference signal.

3. An overspeed detection circuit according to claim 2 wherein said means for detecting includes a threshold circuit receiving said difference signal and being operative to change its output from a first condition to a second condition upon occurence of said predetermined condition.

4. An overspeed detection circuit according to claim 3 wherein said means for detecting further includes a breakdown diode between an output and an input of said threshold circuit, said breakdown diode being poled for a reverse voltage drop during said first condition whereby said output is permitted to attain a voltage substantially equal to said reverse voltage drop while maintaining said input at substantially zero volts.

5. An overspeed detection circuit according to claim 4 wherein said means for producing an overspeed signal includes a transistor receiving said output of said threshold circuit and operative to enter one of a cut-off condition and a saturated condition upon the occurence of said first condition and the other of said cut-off condition and said saturated condition upon the occurence of said second condition.

6. A method for detecting an overspeed condition and for producing an overspeed signal for use in controlling a prime mover of a type including a stop valve effective for shutting off a supply of motive fluid to said prime mover upon receipt of said overspeed signal comprising:

generating a speed signal related to a speed of said prime mover;

producing an acceleration signal related to a rate of change of said speed signal;

summing said speed signal with said acceleration signal to produce a summed signal;

differencing said summed signal at least with a reference signal to produce a difference signal; and detecting a predetermined condition of said difference signal and producing said overspeed signal in response thereto.

* * * * *